Aug. 4, 1936. J. HEINEN 2,049,805
VALVE
Filed June 19, 1933
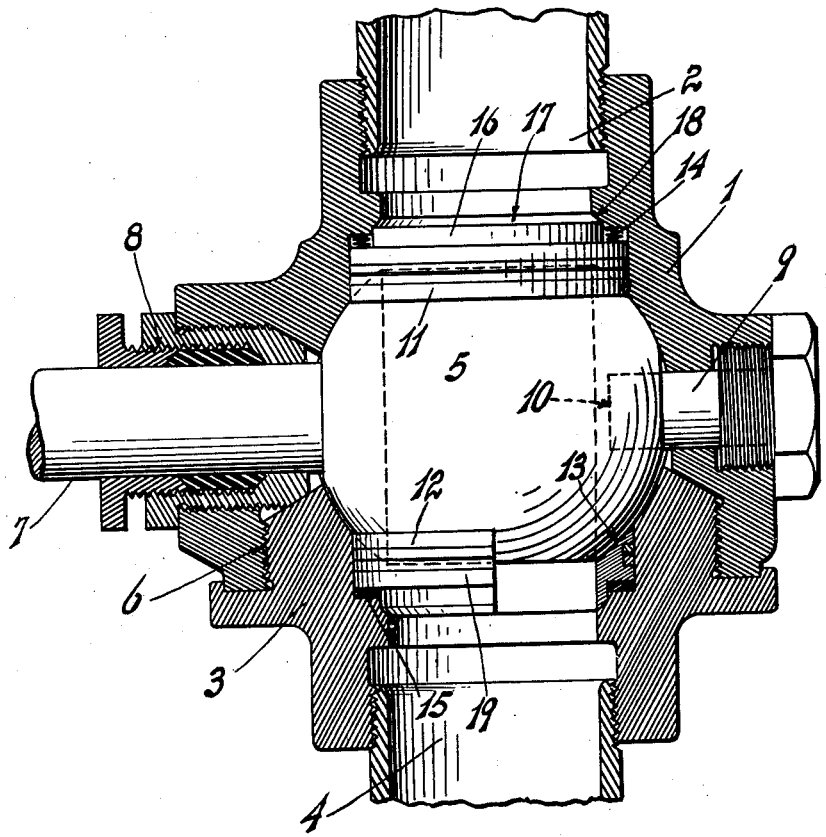
INVENTOR.
JOSEPH HEINEN.
BY
ATTORNEY.

Patented Aug. 4, 1936

2,049,805

UNITED STATES PATENT OFFICE 2,049,805

VALVE

Joseph Heinen, Long Beach, Calif.

Application June 19, 1933, Serial No. 676,493

3 Claims. (Cl. 251—113)

This invention relates to a valve of the spherical or ball cock type.

An object of my invention is to provide a novel valve in which the sphere or ball cock can be inserted in the body thru an opening which is closed by a threaded cap, thereby eliminating bolts, studs, or the like.

Another object is to provide a novel means of rotatably mounting the ball cock so that it will move accurately in the body.

A further object is to provide novel packing rings whereby the ball cock is effectively sealed and leakage is prevented when the valve is both open and closed.

A further object is to provide a novel resilient packing back of the sealing rings, the packing serving to press the rings against the ball cock.

Other objects, advantages and features of invention may appear from the accompanying drawing, the subjoined detailed description and the appended claims.

In the drawing

The figure in the drawing is a longitudinal sectional view of my valve, the ball cock and one of the rings being shown in elevation.

Referring more particularly to the drawing, the numeral 1 indicates the valve body which is provided with an intake 2. A cap 3 screws into the body 1 and this cap is provided with an outlet 4. The body 1 and cap 3 are provided with a spherical opening to receive a ball cock 5. The cap screws into an opening 6 in the body 1 and this opening is of sufficient size so that the ball cock 5 can be readily inserted into the body thru the opening.

It will be evident that by this construction, I eliminate all bolts or studs for holding parts of the body together, and I therefore increase the strength of the body. The ball 5 has a shaft 7 extending from one side thereof and the bolt is rotated by this shaft. A stuffing box 8 is mounted in the body 1 around the shaft 7 to prevent leakage around this shaft.

A stud 9 screws into the body 1 and extends into and accurately fits a recess 10 in the ball 5. The shaft 7 and stud 9 are in axial alignment and by this arrangement, I accurately mount the ball 5 so that it can be easily rotated; and also this ball will not tend to press downwardly in the body when in closed position due to the pressure of the line extending into the valve. This mounting relieves wear on the ball and also enables the ball to be more accurately packed off, as will be subsequently described. The stud 9 is removed when it is necessary to repair the ball or to replace the same.

Annular packing rings 11, 12 are provided in the body at both the intake 2 and the outlet 4. These packing rings are so cut that a seat 13 is provided in each of them for the ball 5. The packing rings are pressed against the ball by some suitable resilient means, such as the springs 14, or the rubber packing 15.

Each of the rings is provided with an integral collar 16, each collar being formed with a tapered seat 17 which rests against a tapered surface 18 in the body or cap. This tapered seat further prevents possible leakage around the packing rings. The packing rings 11, 12 may be provided with annular metallic packing 19, if it is found necessary.

It will be evident from the foregoing description that the method of mounting the ball 5 will hold it accurately in position in the body and consequently, the packing rings 11, 12 can be accurately fitted against the outer surface of the ball. This insures a good fit and will prevent leakage.

The stud 9 also relieves the stuffing box 8 of unnecessary wear because of the line pressure against the ball 5, tending to displace this ball.

Having described my invention, I claim:

1. A valve comprising a body, a cap threaded into the body, a ball cock, the body and the cap having spherical openings therein to receive the ball cock, a shaft projecting from the ball cock, a stud extending thru the body into the ball cock, an intake in the body, an outlet in the cap, and metallic packing rings mounted in the intake and outlet, said rings bearing against the ball cock, a collar extending from each of the metallic rings, a tapered surface on each of the collars, and a tapered seat in the body to receive said surface.

2. A valve comprising a body, a cap threaded into the body, a ball cock, the body and the cap having spherical openings therein to receive the ball cock, a shaft projecting from the ball cock, a stud extending thru the body into the ball cock, an intake in the body, an outlet in the cap, metallic packing rings mounted in the intake and outlet, said rings bearing against the ball cock, a collar extending from each of the metallic rings, a tapered surface on each of the collars, a tapered seat in the body to receive said surface, and resilient rubber packing bearing against a packing ring whereby said ring is urged against the ball.

3. A valve comprising a body, said body having an opening therein, a cap threaded into the opening, a ball cock seated in the body, said ball cock being adapted to be inserted into the body thru said opening, a shaft projecting from the ball cock, a stud threaded into the body and projecting into the ball cock, said stud supporting one end of the ball cock, an intake in the body, an outlet in the cap, solid annular packing rings in the intake and outlet, said packing rings fitting against the ball cock, a collar integrally formed with each of the packing rings and projecting therefrom, a tapered surface on each of the collars and a tapered seat in the body and cap to receive said tapered surface, and resilient rubber packing bearing against a packing ring whereby the ring is urged against the ball.

JOSEPH HEINEN.